United States Patent
Robertson et al.

(10) Patent No.: US 8,355,199 B1
(45) Date of Patent: Jan. 15, 2013

(54) OPTICAL RF FILTER WAVELENGTH LOCKED TO LASER WITH FIXED OFFSET FREQUENCY

(75) Inventors: Stephen Robertson, Harleysville, PA (US); Thomas W. Karras, Berwyn, PA (US)

(73) Assignee: Lockheed Martin Corporation, Bethesda, MA (US)

(*) Notice: Subject to any disclaimer, the term of this patent is extended or adjusted under 35 U.S.C. 154(b) by 434 days.

(21) Appl. No.: 12/784,076

(22) Filed: May 20, 2010

Related U.S. Application Data

(60) Provisional application No. 61/180,397, filed on May 21, 2009.

(51) Int. Cl.
*G02B 6/26* (2006.01)
(52) U.S. Cl. ........... 359/333; 398/115; 385/27; 359/245
(58) Field of Classification Search .................. 398/115, 398/183, 187; 385/3, 15, 27, 30, 39; 359/333, 359/245
See application file for complete search history.

(56) References Cited

U.S. PATENT DOCUMENTS

| | | | |
|---|---|---|---|
| 6,473,218 B1 | 10/2002 | Maleki et al. | |
| 7,092,591 B2 | 8/2006 | Savchenkov et al. | |
| 7,283,707 B1 | 10/2007 | Maleki et al. | |
| 7,587,144 B2 | 9/2009 | Ilchenko et al. | |
| 2005/0185681 A1* | 8/2005 | Ilchenko et al. | 372/20 |
| 2009/0097516 A1* | 4/2009 | Maleki et al. | 372/26 |
| 2010/0118375 A1* | 5/2010 | Maleki et al. | 359/239 |

* cited by examiner

*Primary Examiner* — Mark Hellner
(74) *Attorney, Agent, or Firm* — Fraser Clemens Martin & Miller LLC; J. Douglas Miller

(57) ABSTRACT

An optical filter is disclosed, including a first optical filter adapted to receive a first optical signal including an optical carrier frequency and a plurality of interference signal components. The first filter produces an output signal at the optical carrier frequency and a reflection signal. The output signal is split into a peak detection path signal and a re-insertion path signal. An optical power detector converts the peak detection path signal into an electrical control signal and aligns the optical carrier frequency to a resonance frequency of the first filter to maximize the power of the optical carrier frequency. A second optical filter receives the reflection signal and selects at least one spectral component while rejecting other spectral components and outputs a filtered signal that carries the selected spectral component. A signal combiner receives and combines the filtered signal and the re-insertion path signal.

20 Claims, 4 Drawing Sheets

OPTICAL RF FILTER WAVELENGTH LOCKED TO LASER WITH FIXED OFFSET FREQUENCY

CROSS-REFERENCE TO RELATED APPLICATIONS

The present application claims priority to U.S. Provisional Patent Application Ser. No. 61/180,397 filed May 21, 2009.

STATEMENT REGARDING FEDERALLY SPONSORED RESEARCH OR DEVELOPMENT

Not applicable.

FIELD OF THE INVENTION

The invention relates to radio frequency ("RF") filtering, and in particular, to wavelength locking between an optical source and various resonant elements used to construct the RF filter.

BACKGROUND OF THE INVENTION

Various applications require filtering of multiple combined spectral components in signals by selecting one or more of the spectral components while rejecting the other components. One example is band pass filtering where a selected one or more spectral components within a spectral pass band are selected to transmit and spectral components outside the spectral band are rejected. A filter may be tunable, e.g., under a control of a tuning control signal, to change the frequency range of the filtered signal.

Optical band pass filters are known where optical spectral components within a spectral window transmit through the filter while other spectral components outside the spectral window are rejected. It is known to construct optical band pass filters using optical resonators, which are small electro-optical devices, having diameters on the order of millimeters, formed of curved optical waveguides, for example, a cylinder, a sphere, or a toroid within which light is internally reflected at the inner surface of the optical resonator. Some optical resonators can support resonator modes of light called whispering gallery modes, and thus, are often referred to as whispering gallery mode resonators. Whispering gallery modes occur when light having an evanescent wave component travels via internal reflection around the periphery of the optical resonator. The whispering gallery modes of optical resonators reside close to the surface of the optical resonator, and undergo total internal reflection. The evanescent wave component extends beyond the optical resonator's outer surface and may be coupled into an adjacent optical coupler as long as the optical coupler is located within the extent of the evanescent wave, typically on the order of the light's wavelength.

Many optical resonators which propagate whispering gallery modes of light have extremely low transmission losses, and as a result, have a very high quality factor Q. High Q optical resonators are desirable because the higher the Q, the longer the amount of time the internally reflected light will remain within the optical resonator.

Optical domain filters are able to filter any desired signal including RF, microwave, millimeter, Gigahertz or Terahertz frequency that is modulated as a sideband on an optical carrier. The use of whispering gallery mode resonator technology allows for designing optical domain filters with features of small size and weight, suitable for ground as well as spacecraft applications.

RF filtering using whispering gallery mode resonator technology requires wavelength locking between the optical carrier source and the optical resonators used to construct the filter. It is possible to achieve wavelength locking of semiconductor lasers to whispering gallery mode resonators with a zero spectral offset, but such an arrangement is not useful because the RF sideband spectrum is rejected along with the laser spectrum by the whispering gallery mode resonator filter. Some known wavelength locking implementations directly sample the carrier signal to create a reference signal prior to the addition of a modulated signal and later combine the sampled carrier signal with a filtered spectral component. However, such implementations require complicated time delay elements to compensate for group delay of the filtered spectral components. Further, such implementations are only useful for relatively short optical paths, and are unable to effectively maximize the carrier signal power for peak detection and locking. It is therefore desirable to develop a system and method for wavelength locking between the optical source and the optical resonators used to construct a band pass filter that fixes the optical source at an offset from the center of the band pass filter's passband, so that suppression of the optical source spectrum does not result in suppression of the RF sideband carrying the information of interest. It is further desirable to perform the filtering function and the wavelength locking function on a single input signal to eliminate time delay elements.

Additionally, some complex optical links apply multiple modulations to the optical source spectrum to accomplish frequency translation of the RF signal, as for example with a local oscillator ("LO") signal modulating the optical signal. The complex optical links having multiple modulations present a complicated mix of RF and LO sidebands to the optical input of the filter, creating background interference noise that interferes with the ability to lock to, or even recognize, the presence of the optical carrier among the various sidebands. Therefore, it is desirable to develop a system and method for wavelength locking between the optical source and the optical resonators used to construct a band pass filter that isolates the optical carrier from multiple sidebands so that it can be used to lock the filter to the carrier, while at the same time creating an offset between the laser and the filter so that an RF signal of interest passes through the passband of the filter.

SUMMARY OF THE INVENTION

Concordant and consistent with the present invention, a system and method for an optical RF filter wavelength locked to laser with a fixed offset frequency has been discovered.

A first whispering gallery mode resonator filter is adapted to receive a first optical signal including an optical carrier frequency and a plurality of interference signal spectral components. The first filter produces an output signal at the optical carrier frequency and a reflection signal including the plurality of interference signal components. The output signal is split into a peak detection path signal and a re-insertion path signal. An optical power detector receives the peak detection path signal and converts the peak detection path signal into an electrical control signal and aligns the optical carrier frequency to a resonance frequency of the first filter to maximize the power of the optical carrier frequency, thereby facilitating locking the optical carrier frequency to the first whispering gallery mode resonator filter pass band. A second whispering gallery mode resonator filter receives the reflection signal and selects at least one spectral component in the reflection signal while rejecting other spectral components and outputs a filtered signal that carries the at least one selected spectral component. A signal combiner receives and combines the filtered signal and the re-insertion path signal for further processing in the optical domain.

Optionally, a portion of the reflection signal may be received by an optoelectronic receiver adapted to align the signals.

In one embodiment, the second whispering gallery mode resonator filter is a multi-pole filter. In another embodiment, the first and second whispering gallery mode resonator filters are mounted to an isothermal substrate to ensure thermal and vibrational stability within the system.

In a further embodiment, the first and second whispering gallery mode resonator filters are designed to include a predetermined free spectral range offset.

DRAWINGS

The above, as well as other advantages of the present disclosure will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
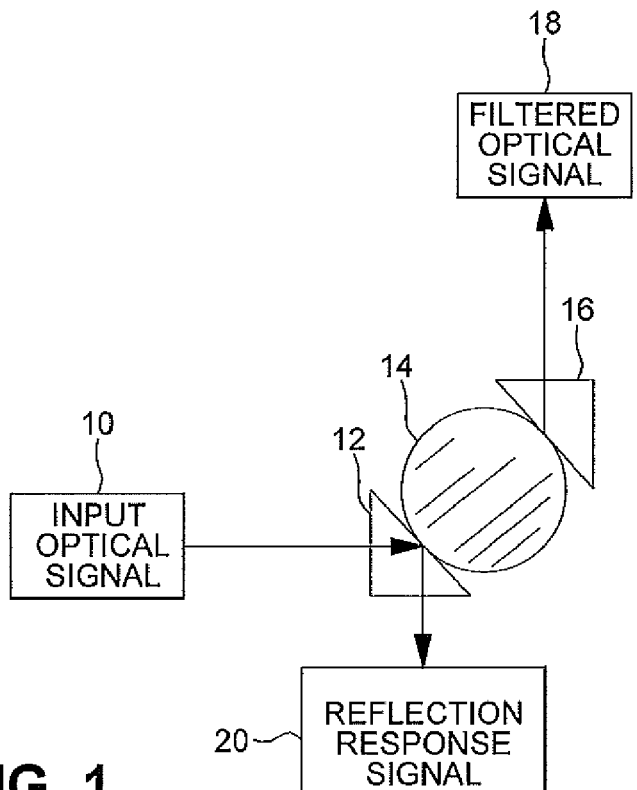
FIG. 1 is a schematic representation of a first prism coupled whispering gallery mode resonator filter as known in the prior art.

Prism coupled whispering gallery mode resonators, as shown in FIG. 1, are known to be three-port networks. An input optical signal 10 is transmitted to and received by a first coupling prism 12. A first whispering gallery mode resonator filter 14 receives the input optical signal 10. Depending upon the construction of the first whispering gallery mode resonator filter 14, only a preselected portion of the input optical signal 10 is allowed to pass through the whispering gallery mode resonator filter 14. In particular, depending upon whispering gallery mode characteristics such as the quality factor Q, the passband bandwidth, and the free spectral response of the first whispering gallery mode resonator filter 14, the first whispering gallery mode resonator filter 14 may be configured sufficiently narrowly to preselect only a spectral component signal of interest of the input optical signal 10 for transmission therethrough. A second coupling prism 16 receives the preselected spectral component signal of interest from the first whispering gallery mode resonator filter 14 and transmits the preselected spectral component signal of interest as the filtered optical signal 18. Finally, that portion of the input optical signal 10 that is not transmitted through the first whispering gallery mode resonator filter 14 is reflected through the first coupling prism 12, and is available for transmission as a reflection response signal 20.

Figure 2A:
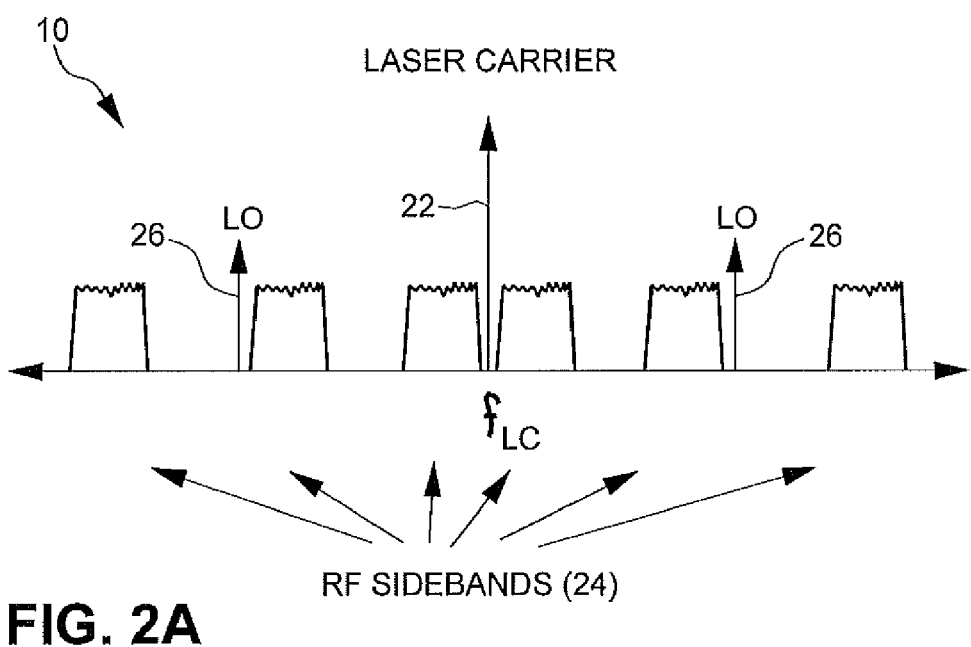
FIGS. 2A, 2B and 2C are schematic representations of a modulated input optical signal, a filtered carrier signal and a reflection response signal, respectively, provided by the first prism coupled whispering gallery mode resonator filter of FIG. 1.

One representative schematic of a complex input optical signal 10 is depicted in FIG. 2A. An optical carrier 22 having a center frequency $f_{LC}$ and typically produced by a laser or similar optical component is modulated using a known frequency translation technique, such as with an electro-absorption modulator (not shown), by a plurality of converted RF and LO input signals. In the example of FIG. 2A, six RF sidebands 24 and two LO sidebands 26 are added to the laser carrier. Each of the six RF sidebands 24 and the two LO sidebands 26 are modulated to an optical carrier frequency different from the optical carrier center frequency $f_{LC}$, where the difference between the frequency of any individual sideband 24, 26 and the optical carrier center frequency $f_{LC}$ is equal to the original frequency of the individual sideband. If the optical carrier center frequency $f_{LC}$ is in the THz range or higher and each signal is in the RF band (typically understood to be between 3 kHz and 300 GHz), it is clear that the differences between the RF and LO sidebands and the optical carrier frequency may be very small. It is further clear that the plurality of RF sidebands 24 and LO sidebands 26, when modulated onto the optical carrier 22, may appear as background or interference signals that interfere with or prevent locking to the optical carrier center frequency $f_{LC}$. Further, selectively filtering any of the RF sidebands 24 or LO sidebands 26 solely from the combined signal of FIG. 2A is difficult.

Figure 2B:
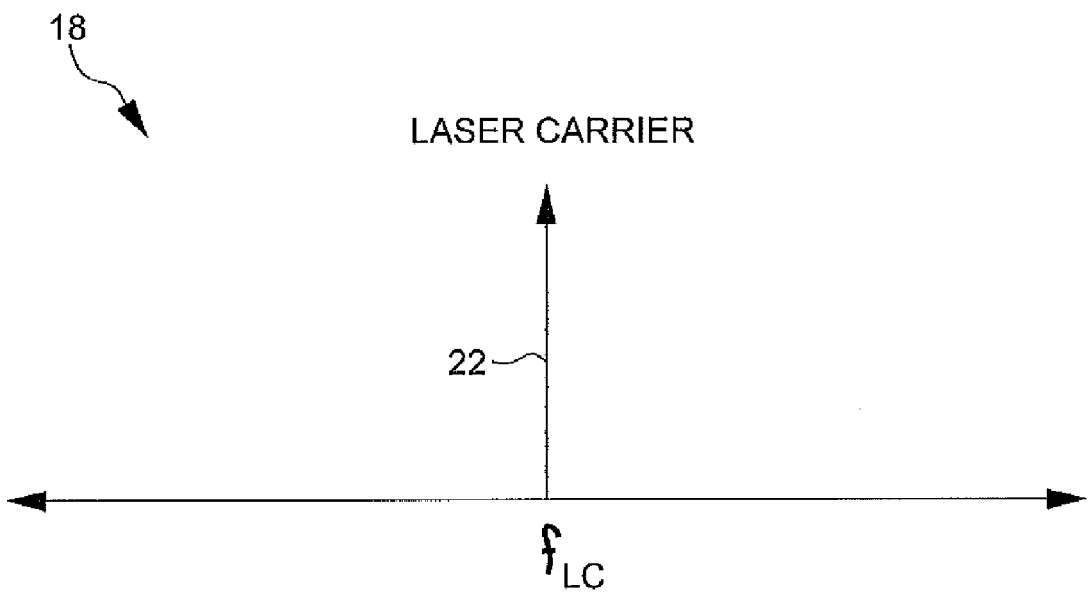
Figure 2C:
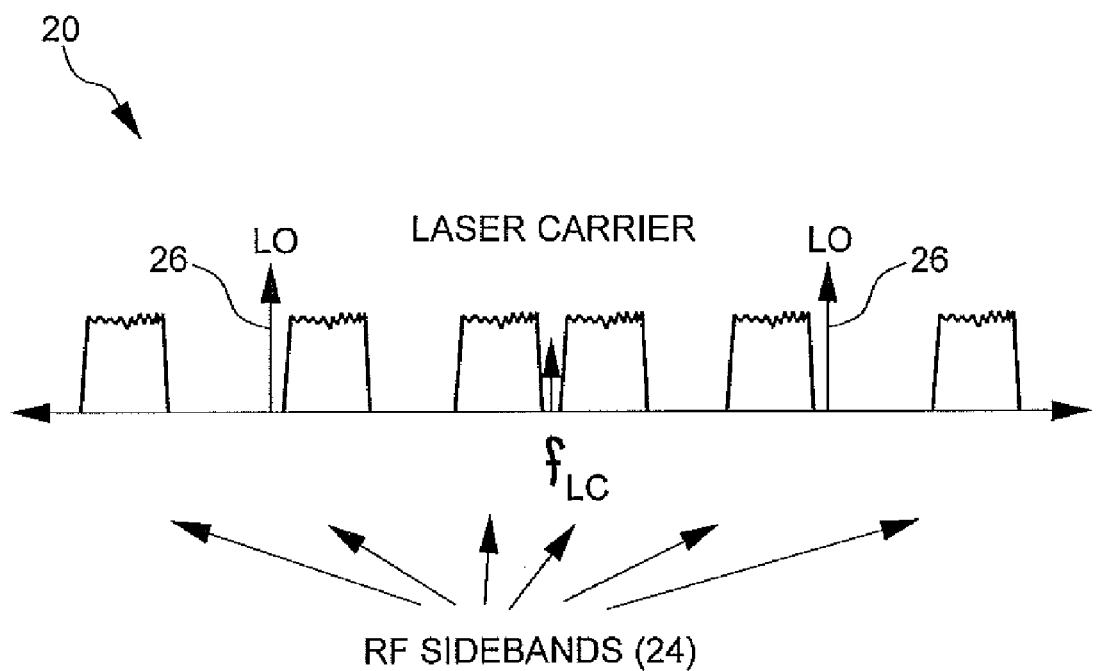

As applied to the whispering gallery mode resonator filter discussed above with reference to FIG. 1, the first whispering gallery mode resonator filter 14 may be configured sufficiently narrowly to preselect only a spectral component signal of interest of the input optical signal 10 for transmission therethrough as the filtered optical signal 18. If the first whispering gallery mode resonator filter 14 is configured narrowly to pass only the optical carrier center frequency $f_{LC}$ while rejecting all other signal components, then the filtered optical signal may be represented to have the appearance shown in FIG. 2B. All of the rejected signal components, including all of the RF sidebands 24 and the LO sidebands 26 but excluding the optical carrier center frequency $f_{LC}$ are contained in the reflection response signal 20, which may be represented as having the appearance shown in FIG. 2C, including a null at the optical carrier center frequency $f_{LC}$. A low bandwidth power detector would not be able to discriminate between any of the sidebands 24, 26 and the null at the optical carrier center frequency $f_{LC}$.

Figure 3:
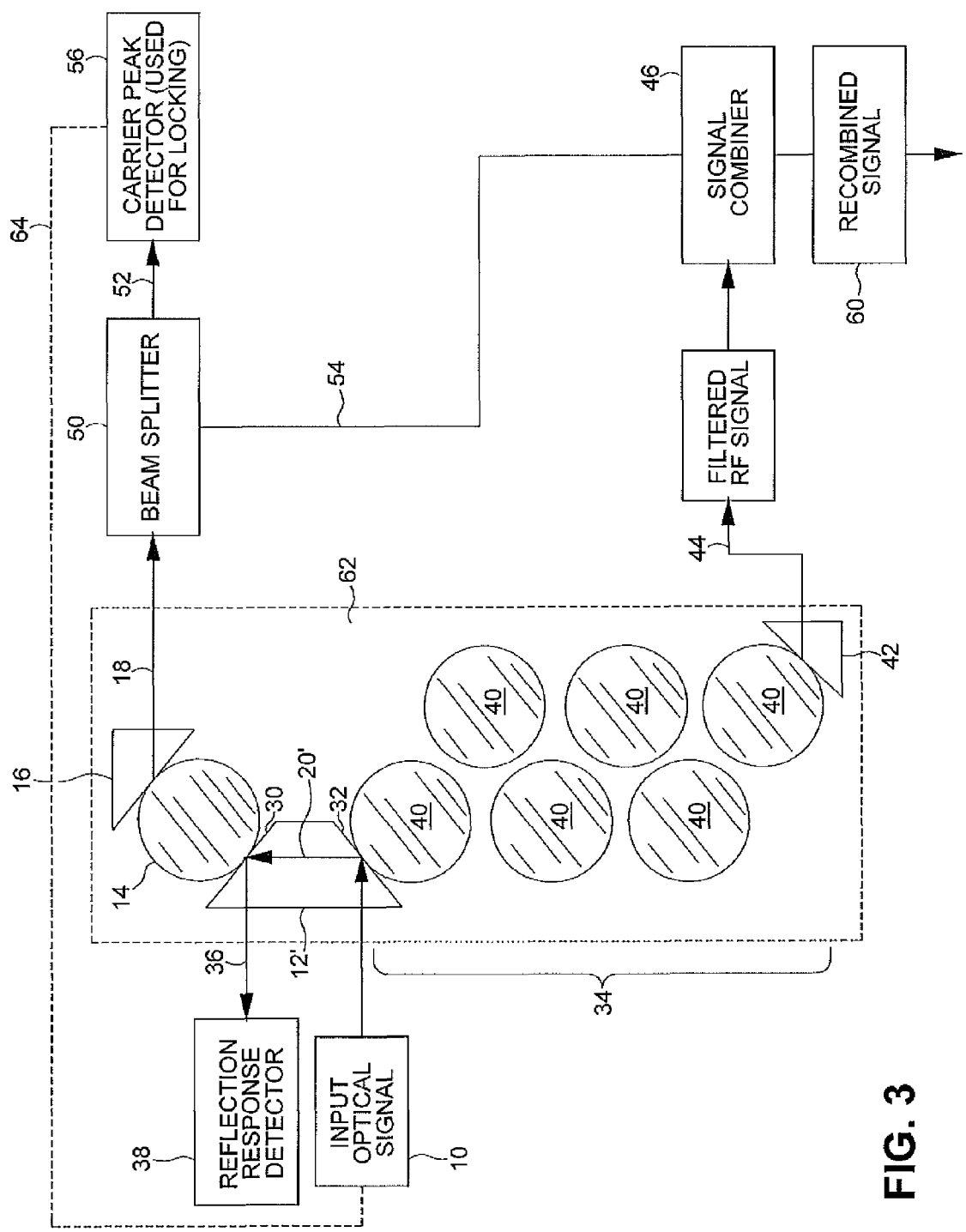
FIG. 3 is a schematic representation of an optical RF filter wavelength locked to a laser with fixed offset frequency, according to an embodiment of the invention.

One embodiment of an optical RF filter wavelength locked to a laser with fixed offset frequency according to the present invention is shown in FIG. 3. The input optical signal 10, as represented in FIG. 2A, is transmitted to and received by a first coupling prism 12'. The first coupling prism 12' may be a dove prism as shown in FIG. 3, or it may be a coupling prism as shown in FIG. 1. The dove coupling prism 12' includes a first coupling surface 30 adjacent a first whispering gallery mode resonator filter 14 and a second coupling surface 32 adjacent a second whispering gallery mode resonator filter 34. In the embodiment shown in FIG. 3, the input optical signal 10 is received by the dove prism on the second coupling surface 32, and a reflection signal 20' is directed to the first coupling surface 30. The input optical signal 10 may be received on the first coupling surface 30 if desired, but directing the input optical signal 10 to the second coupling surface 32 ensures that the second whispering gallery mode resonator filter 34 receives a sufficiently high-strength input optical signal 10.

The portion of the input optical signal 10 that is not transmitted through the second whispering gallery mode resonator filter 34 is reflected through the first coupling prism 12' as the reflection response signal 20' to the first coupling surface 30 of the coupling prism 12'. The first coupling surface 30 of the coupling prism 12' also reflects a portion of the reflection response signal 20' as a detection signal 36 that is received by a reflection response detector 38, which is used during system alignment.

The first whispering gallery mode resonator filter 14 receives the reflection signal 20' and passes a preselected portion of the input optical signal 10 therethrough. In particular, depending upon whispering gallery mode characteristics such as a resonant frequency, a quality factor Q, a passband bandwidth, an optical center frequency, and a free spectral response of the first whispering gallery mode resonator filter 14, the first whispering gallery mode resonator filter 14 may be configured sufficiently narrowly to preselect only a spectral component signal of interest of the reflection signal 20' for transmission therethrough. In one embodiment, the spectral component signal of interest is centered narrowly on the optical carrier center frequency $f_{LC}$. The second coupling prism 16 receives the preselected spectral component signal of interest from the first whispering gallery mode resonator filter 14 and transmits the preselected spectral component signal of interest as the filtered optical signal 18, which is subsequently split by a beamsplitter 50 into a first path 52 and a second path 54. It is understood that the beamsplitter 50 may split the filtered optical signal 18 into the first path 52 and the second path 54 having substantially similar or different signal strengths as desired. The second path 54 of the filtered optical signal 18 is transmitted to and received by a signal combiner 46.

The first path 52 of the filtered optical signal 18 is transmitted to and is received by a carrier peak detector 56. The carrier peak detector 56 receives the first path signal 52 and converts the first path signal 52 into an electrical signal 64 that is used to lock the laser carrier center frequency to the resonant frequency of the first whispering gallery mode resonator filter 14. In particular, the carrier peak detector 56 is an optical power detector that converts the first path signal 52 into an electrical signal 64 that is proportional to the peak detected signal power. Since the electrical signal will be maximized when the frequency of the optical carrier is aligned with the optical carrier center frequency $f_{LC}$ preferentially passed by the first whispering gallery mode resonator filter 14, the electrical signal 64 may be used as a control signal to adjust the carrier frequency substantially to the desired optical carrier center frequency $f_{LC}$, and to thereby lock the frequency of the optical carrier to the resonant frequency of the whispering gallery mode resonator filter 14. Additionally, because the optical carrier center frequency $f_{LC}$ is controlled with the electrical signal 64, the first whispering gallery mode resonator filter 14 need not be a tunable whispering gallery mode resonator.

The portion of the input optical signal 10 that is not reflected to the first whispering gallery mode resonator filter 14 is transmitted through the second coupling surface 32 of the first coupling prism 12' to the second whispering gallery mode resonator filter 34. The main portion of the input optical signal 10 is thus transmitted to and is received by the whispering gallery mode resonator filter 34. While it is possible to utilize a single pole whispering gallery mode resonator 40, favorable results have been obtained when utilizing a multi-pole whispering gallery mode resonator filter having multiple whispering gallery mode resonators 40, because single resonators 40 tend to exhibit relatively wider passbands. Further, when the RF and LO sidebands 24, 26 are closely spaced, a single whispering gallery mode resonator 40 may not be able to separate and resolve the closely spaced sidebands 24, 26. Therefore, more than one whispering gallery mode resonator 40 is coupled and cascaded to create the multi-pole whispering gallery mode resonator filter 34 capable of high frequency resolution and exhibiting a narrow passband. The multi-pole whispering gallery mode resonator filter 34 is constructed using known methods, and may include individually or collectively tunable whispering gallery mode resonators 40. The individual whispering gallery mode resonators 40 may be directly coupled or may be closely spaced, as desired. In FIG. 3, six individual whispering gallery mode resonators 40 are arranged to create a multi-pole whispering gallery mode resonator filter 34 that is a sixth-order multi-pole optical filter. It is understood that lower or higher order multi-pole optical filters may be employed as desired.

As noted, the individual whispering gallery mode resonators 40 may be tunable resonators using conventional means, such as electrical or thermal tuning, to allow for selective filtering of only a portion of the spectral components contained in the reflection response signal 20'. However, favorable results have been obtained when the whispering gallery mode resonator filter 34 is designed and implemented to allow for discrete filtering of a portion of the spectral components contained in the input optical signal 10. Accordingly, various characteristics of the individual whispering gallery mode resonators 40 that comprise the whispering gallery mode resonator filter 34 may be altered to obtain only the desired portion of the input optical signal 10. As non-limiting examples, some of the characteristics of each whispering gallery mode resonator 40 that may be altered include the quality factor Q, the bandwidth, the size of any gaps between adjacent resonators 40, and placement of each resonator 40 within a cascaded group.

Figure 4A:
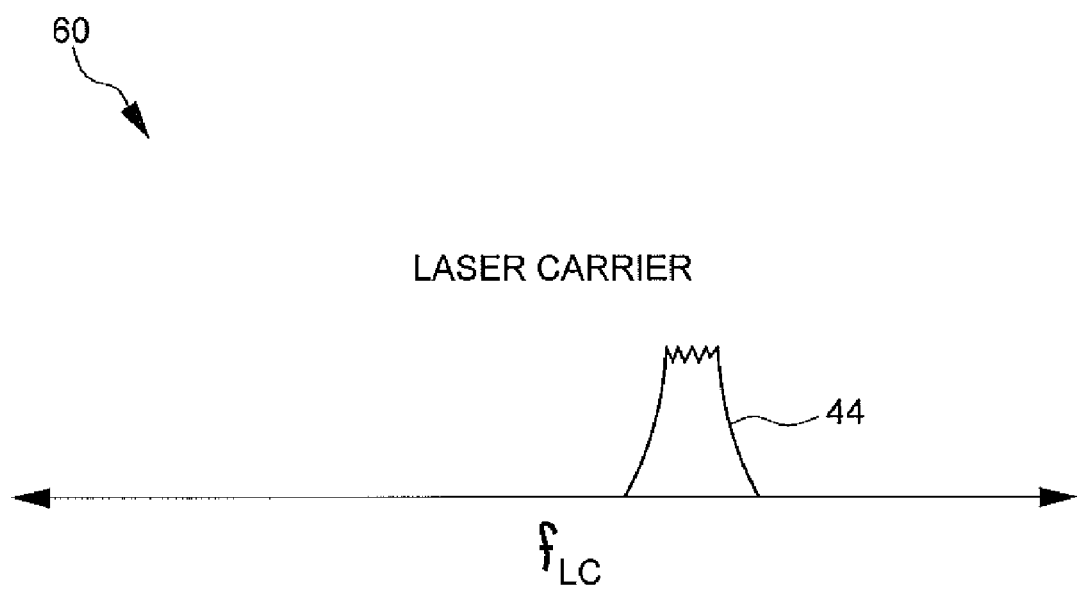
FIGS. 4A and 4B are respective schematic representations of a frequency offset signal of interest and the signal of interest combined with the filtered carrier signal generated according to the present invention.
Figure 4B:
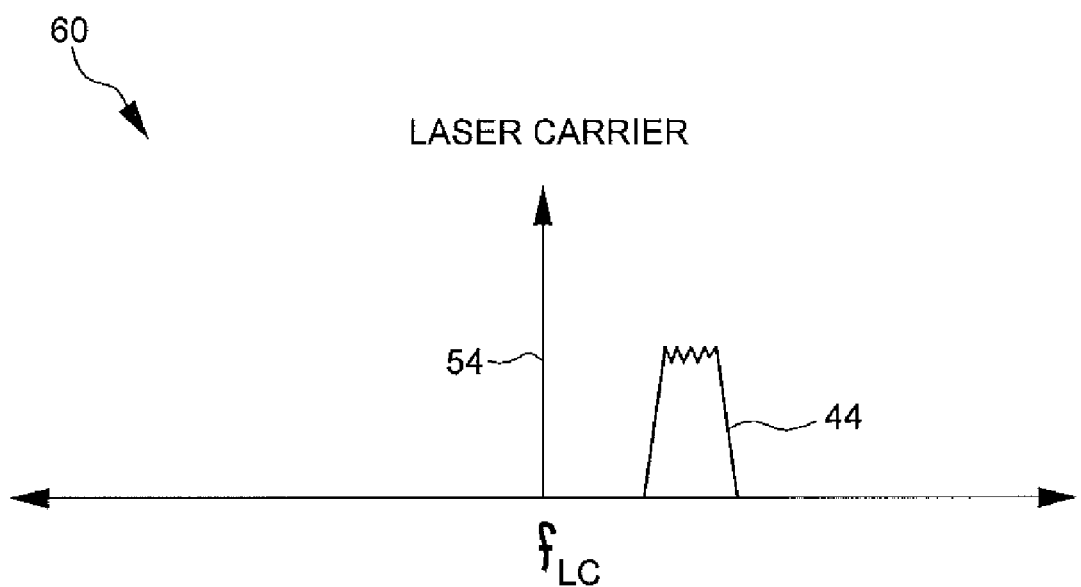

A terminal coupling prism 42 is coupled to at least one of the whispering gallery mode resonators 40 to allow for the filtered signal 44 to be extracted from the whispering gallery mode resonator filter 34. The filtered signal 44 includes only a narrow, preselected portion of the reflection response signal 20' corresponding only to a preselected portion of one of the sidebands of interest, and has a predetermined passband shape. A representation of the filtered signal 44 is shown in FIG. 4A. Additionally, the whispering gallery mode resonator filter 34 may be designed to provide a desired frequency offset to the filtered signal 44 to provide a known frequency gap between the optical carrier center frequency $f_{LC}$ and the filtered signal 44. The filtered signal 44 is transmitted to a signal combiner 46, where it is combined with the filtered carrier signal 18 received along the second path 54 to create a carrier recombined signal 60 that includes only the narrow preselected portion of the input optical signal 10 and the carrier signal 18. A representation of the carrier recombined signal 60 is shown in FIG. 4B. Thus, a preselected component of the input optical signal 10 may be filtered, offset and combined with the locked optical carrier signal. The recombined signal 60 is then available for further processing in the photonic domain or for heterodyne detection and conversion to the electronic domain.

The frequency offset may be preselected by carefully designing the whispering gallery mode resonator filter 14 or the whispering gallery mode resonator filter 34, or if tunable, the tuning of each of the whispering gallery mode resonators 14, 40 within the respective filters. Each of the whispering gallery mode resonators 40 is selected to possess the same optical center frequency to within a tight tolerance. Favorable results have been obtained when each of the whispering gallery mode resonators 40 within the filter 34 possess the same optical center frequency to within a small fraction of the filter passband bandwidth. The optical center frequency of the whispering gallery mode resonator filter 14 used to perform the filtering of the optical carrier is selected to include a predetermined offset from the optical center frequency of each of the whispering gallery mode resonators 40 and the filter 34. The predetermined offset in optical center frequency between the whispering gallery mode resonator filter 14 and the filter 34 defines the offset between the optical carrier center frequency $f_{LC}$ and the frequency of the signal of interest in the filtered RF signal 44.

To maintain the desired frequency offset between the optical carrier center frequency $f_{LC}$ and the frequency of the signal of interest, all whispering gallery mode resonators, including both the first whispering gallery mode resonator filter 14 and the whispering gallery mode resonators 40 of the whispering gallery mode resonator filter 34, are co-located on a single isothermal substrate 62. Mounting both the whispering gallery mode resonator filter 14 and the filter 34 to the same substrate ensures that any changes in the substrate temperature will produce equal changes in the optical center frequency of all affected whispering gallery mode resonators 14, 40. Thus, if the temperature of the substrate 62 (or a housing thereof) changes over time, the passband response of the multi-pole filter 34 will not be affected. Additionally, the frequency offset between the whispering gallery mode resonator filter 14 and the multi-pole filter 34 will remain fixed. Further, mounting both the first whispering gallery mode resonator filter 14 and the whispering gallery mode resonators 40 to the same substrate 62 ensures that external vibration will equally affect both the first whispering gallery mode resonator filter 14 and the whispering gallery mode resonators 40. Thus, any preselected frequency offset between the optical carrier center frequency $f_{LC}$ and the frequency of the signal of interest in the filtered signal 44 is maintained by the mounting arrangement. Finally, the optical carrier frequency can be tuned to follow the resonant frequency of the whispering gallery mode resonator filter 14 at all times, ensuring locking of the carrier frequency to the filter and further ensuring the accuracy and robustness of the combined signal 64.

The wavelength locking system of the present invention therefore is able to directly isolate, maximize and lock to the optical carrier signal with high precision in the presence of a plurality of interfering RF and LO sidebands by using a separate whispering gallery mode resonator filter 14 having predetermined optical center frequency and offset characteristics to lock the optical carrier center frequency to the whispering gallery mode resonator filter 14. Direct access to only the unfiltered optical carrier signal is therefore unnecessary. The second whispering gallery mode resonator filter 34 creates an offset between the optical carrier center frequency and the filter 34 while allowing only a predetermined portion of the interfering signals to pass through the passband of the filter 34 for recombination with the optical carrier signal, thereby providing a clean signal available for further processing in the optical domain.

While certain representative embodiments and details have been shown for purposes of illustrating the invention, it will be apparent to those skilled in the art that various changes may be made without departing from the scope of the disclosure, which is further described in the following appended claims.

What is claimed is:

1. An optical filter, comprising:
   a first whispering gallery mode resonator filter adapted to receive at least a portion of a first optical signal including an optical carrier frequency and a plurality of interference signal spectral components, the first filter producing an output signal at the optical carrier frequency, the output signal split into a peak detection path signal and a re-insertion path signal;
   an optical power detector adapted to receive the peak detection path signal and convert the peak detection path signal into an electrical control signal representative of a power of the optical carrier frequency, wherein the control signal is adapted to align the optical carrier frequency to a resonance frequency of the first filter to maximize the power of the optical carrier frequency;
   a second whispering gallery mode resonator filter adapted to receive at least a portion of the first optical signal and to select at least one spectral component in the first optical signal while rejecting other spectral components and to output a filtered signal that carries the at least one selected spectral component; and
   a signal combiner that receives and combines the filtered signal and the re-insertion path signal.

2. The optical filter of claim 1, wherein the second filter is a prism coupled whispering gallery mode resonator filter, the first filter receiving a reflection response signal including the optical carrier frequency.

3. The optical filter of claim 1, wherein the first filter is a prism coupled whispering gallery mode resonator filter, the second filter receiving a reflection response signal including the plurality of interference signal components.

4. The optical filter of claim 1, wherein the second filter is a multi-pole filter including at least two optical resonators.

5. The optical filter of claim 3, wherein the multi-pole filter includes six optical resonators.

6. The optical filter of claim 3, wherein at least one of the first filter and the second filter is a tunable filter.

7. The optical filter of claim 1, wherein the first filter and the second filter are mounted on an isothermal substrate.

8. The optical filter of claim 1, wherein a frequency of the filtered signal is offset from a frequency of the re-insertion path signal.

9. The optical filter of claim 8, wherein an optical center frequency of the first filter is offset from an optical center frequency of the second filter.

10. The optical filter of claim 1, further comprising a reflection response detector to receive a portion of the reflection response signal for alignment of the optical filter.

11. An optical filter, comprising:
    a first whispering gallery mode resonator filter adapted to receive at least a portion of a first optical signal including an optical carrier frequency and a plurality of interference signal spectral components, the first filter producing an output signal at the optical carrier frequency, the output signal split into a peak detection path signal and a re-insertion path signal;
    an optical power detector adapted to receive the peak detection path signal and convert the peak detection path signal into an electrical control signal representative of a power of the optical carrier frequency, wherein the control signal is adapted to align the optical carrier frequency to a resonance frequency of the first filter to maximize the power of the optical carrier frequency;
    a second whispering gallery mode resonator filter adapted to receive at least a portion of the first optical signal and to select at least one spectral component in the first optical signal while rejecting other spectral components and to output a filtered signal that carries the at least one selected spectral component, the first and second whispering gallery mode resonator filters mounted on an isothermal substrate; and a signal combiner that receives and combines the filtered signal and the re-insertion path signal, wherein a frequency of the filtered signal is offset from a frequency of the re-insertion path signal.

12. The optical filter of claim 11, wherein the first filter is a prism coupled whispering gallery mode resonator filter, the second filter receiving a reflection response signal including the plurality of interference signal components.

13. The optical filter of claim 11, wherein the second filter is a prism coupled whispering gallery mode resonator filter, the first filter receiving a reflection response signal including the optical carrier frequency.

14. The optical filter of claim 13, wherein at least one of the first filter and the second filter is a tunable filter.

15. The optical filter of claim 13, wherein an optical center frequency of the first filter is offset from an optical center frequency of the second filter.

16. The optical filter of claim 15, wherein the multi-pole filter includes six optical resonators.

17. An optical filter, comprising:

a first whispering gallery mode resonator filter adapted to receive at least a portion of a first optical signal including an optical carrier frequency and a plurality of interference signal spectral components, the first filter producing an output signal at the optical carrier frequency, the output signal split into a peak detection path signal and a re-insertion path signal;

an optical power detector adapted to receive the peak detection path signal and convert the peak detection path signal into an electrical control signal representative of a power of the optical carrier frequency, wherein the control signal is adapted to align the optical carrier frequency to a resonance frequency of the first filter to maximize the power of the optical carrier frequency;

a second whispering gallery mode resonator filter adapted to receive at least a portion of the first optical signal and to select at least one spectral component in the first optical signal while rejecting other spectral components and to output a filtered signal that carries the at least one selected spectral component, the first and second whispering gallery mode resonator filters mounted on an isothermal substrate;

at least one of the first whispering gallery mode resonator filter and the second whispering gallery mode resonator filter producing a reflection response signal, a portion of the reflection response signal received by a reflection response signal detector for alignment of the optical filter; and a signal combiner that receives and combines the filtered signal and the re-insertion path signal, wherein a frequency of the filtered signal is offset from a frequency of the re-insertion path signal.

18. The optical filter of claim 17, wherein the second filter is a prism coupled whispering gallery mode resonator filter, the first filter receiving the reflection response signal including the optical carrier frequency.

19. The optical filter of claim 18, wherein at least one of the first filter and the second filter is a tunable filter.

20. The optical filter of claim 19, wherein an optical center frequency of the first filter is offset from the optical center frequency of the second filter.

* * * * *